United States Patent [19]

Belanger et al.

[11] Patent Number: 5,557,820
[45] Date of Patent: Sep. 24, 1996

[54] APPARATUS FOR PRODUCING AN ION-RICH DIRECTABLE AIR STREAM

[75] Inventors: Michael J. Belanger, Wolverine Lake; Robert J. Wentworth, Farmington Hills, both of Mich.

[73] Assignee: Belanger, Inc., Northville, Mich.

[21] Appl. No.: 365,834

[22] Filed: Dec. 29, 1994

[51] Int. Cl.$^6$ ................................................ B60S 3/06
[52] U.S. Cl. ........................... 15/1.51; 15/316.1; 15/405
[58] Field of Search ................................. 15/316.1, 405, 15/1.51

[56] References Cited

U.S. PATENT DOCUMENTS

| | | | |
|---|---|---|---|
| 4,364,147 | 12/1982 | Biedermann et al. | 15/316.1 X |
| 4,446,592 | 5/1984 | McElroy . | |
| 4,472,889 | 9/1984 | Hanna | 15/316.1 X |
| 4,477,263 | 10/1984 | Shaver et al. . | |
| 4,563,788 | 1/1986 | Kobayashi | 5/316.1 X |
| 4,587,688 | 3/1986 | Gougoulos | 15/316.1 |
| 4,809,392 | 3/1989 | Larson et al. | 15/312.1 |
| 4,934,018 | 6/1990 | Fortier et al. . | |
| 4,949,423 | 8/1990 | Larson et al. . | |
| 4,995,136 | 2/1991 | Smith | 15/316.1 X |
| 5,280,665 | 1/1994 | McElroy et al. | 15/316.1 X |
| 5,405,450 | 4/1995 | Mifsud | 15/312.1 X |

*Primary Examiner*—Chris K. Moore
*Attorney, Agent, or Firm*—Young & Basile

[57] ABSTRACT

A program controllable structure for providing program defined orientations of a nozzle for discharging ionized air onto the surfaces of a workpiece prior to a painting operation. The support structure comprises pivotal cantilevered support arms extending from the cross arm structure of a support arch and a second degree of freedom for the nozzle by means of a pivotal connection between the support arms and the nozzle at the free end of the support arms. Programmable means are provided for determining the orientation of the nozzle relative to the cantilevered arms at each of a plurality of program points.

13 Claims, 4 Drawing Sheets

5,557,820

APPARATUS FOR PRODUCING AN ION-RICH DIRECTABLE AIR STREAM

FIELD OF THE INVENTION

This invention is in the field of industrial air blowers. More particularly it relates to an apparatus for varying the position and orientation of a high flow-rate air nozzle according to a user-determined program related to the physical characteristics of the workpiece, the surfaces of which are impinged upon by the air stream.

BACKGROUND OF THE INVENTION

Industrial applications of high flow-rate directable air blowers include (1) drying the exterior surface of a vehicle immediately after a washing operation and (2) removing dust and the like from the surfaces of manufactured products such as automobile body components prior to painting. The former application typically involves clean but otherwise untreated air whereas the latter is preferably carried out using ionized or electrically charged air to negate the static electricity which causes dust and the like to adhere to the surfaces of a manufactured article.

One commercial blower system for drying washed vehicles involves the suspension of inflatable bag-like units from an arch so that when supplied with air, they depend outwardly and downwardly from the crossbeam of the arch. The blower units have nozzle structures mounted at the free ends so as to be proximate the vehicle surfaces as the vehicle passes through the arch. The nozzle outlets are fixed in position relative to the depending bag structures and actually contact the vehicle during the drying operation. The flexibility of the bag-like structure allows them to bend as necessary to accommodate varying contact surface elevations. See U.S. Pat. No. 4,446,592 issued May 8, 1984 to L. G. McElroy.

It is also known to maintain a fixed orientation of the blower nozzle and air stream despite the fact that it is mounted on the free end of a pivot arm structure which moves through an arc. This is readily achieved by means of a parallelogram arm linkage; see, for example, U.S. Pat. No. 4,949,423 issued Aug. 21, 1990 to S. L. Larson et al. and U.S. Pat. No. 4,934,018 issued Jun. 19, 1990 to D. R. Fortier et al.

In pre-painting dust removal applications, blower structures of the type essentially described above are also known. Such blower structures may further incorporate ion bars to charge the air stream. The typical nozzle, however, is largely or exclusively of metallic construction requiring insulation to ensure proper ion bar operation.

SUMMARY OF THE INVENTION

According to a first aspect of the invention, a high flow-rate blower suitable for numerous industrial applications including but not limited to vehicle surface drying and dust removal is mounted on the free end of a pivotal support arm assembly for arcuate displacement over a range of positions but is further mounted relative to the pivot arm assembly such that the blower outlet or air discharge direction may be oriented essentially independently of the pivot arm position and angle; i.e., air discharge direction is not directly tied to the pivot arm angle as in the fixed nozzle arrangement described above, nor does it maintain a fixed orientation in space by virtue of the use of a parallelogram arm arrangement as also described above. Instead, the blower nozzle is independently pivotally mounted to the pivot arm assembly and controlled in attitude by programmable positioning means which permits any absolute orientation of the nozzle to be selected at any pivot arm angle; e.g., according to a program which takes into account the contours and/or configurations of the workpiece to be treated.

In a preferred embodiment hereinafter described in detail, a venturi-type non-metallic nozzle is mounted on the free end of a counterbalanced arm assembly and is independently pivotal relative to the support arm assembly by means of a second pivot mount and an independent actuator means such as an hydraulic or pneumatic cylinder. A programmable control system having a plurality of independently positionable pivot arm assembly position detectors provides the capability of defining a plurality of discrete blower discharge orientations, each orientation being associated with any desired pivot assembly position. Because the position detectors are positionable over the entire range of pivot arm assembly movement, a progressive or non-progressive program of discrete nozzle orientations can be provided in a customized fashion according to the configuration of the workpiece and/or any other design factor which calls for an ordinary or extraordinary program of nozzle positions.

In accordance with another aspect of the invention, a venturi-type blower nozzle of non-metallic construction is provided with at least one elongate ion bar adjacent and parallel to the air outlet to provide a stream of charged air suitable for dust removal in a pre-painting operation. Such a nozzle is preferably mounted on the free end of a pivotally movable pivot arm assembly and further provided with a second degree of freedom capability by means of an independent pivotal mount and actuator means together with a programmable controller for establishing a program of discretely assumed nozzle orientations as the pivot arm assembly moves through a range of travel which discrete positions may be programmed to occur at any position of pivot arm assembly.

The invention as well as the specific implementations and applications thereof may be best understood from a reading of the following specification which is to be taken with the accompanying patent drawing.

BRIEF DESCRIPTION OF THE DRAWING

FIG. 6 is a block diagram of a control circuit.

DETAILED DESCRIPTION OF THE ILLUSTRATIVE EMBODIMENT

Figure 1:
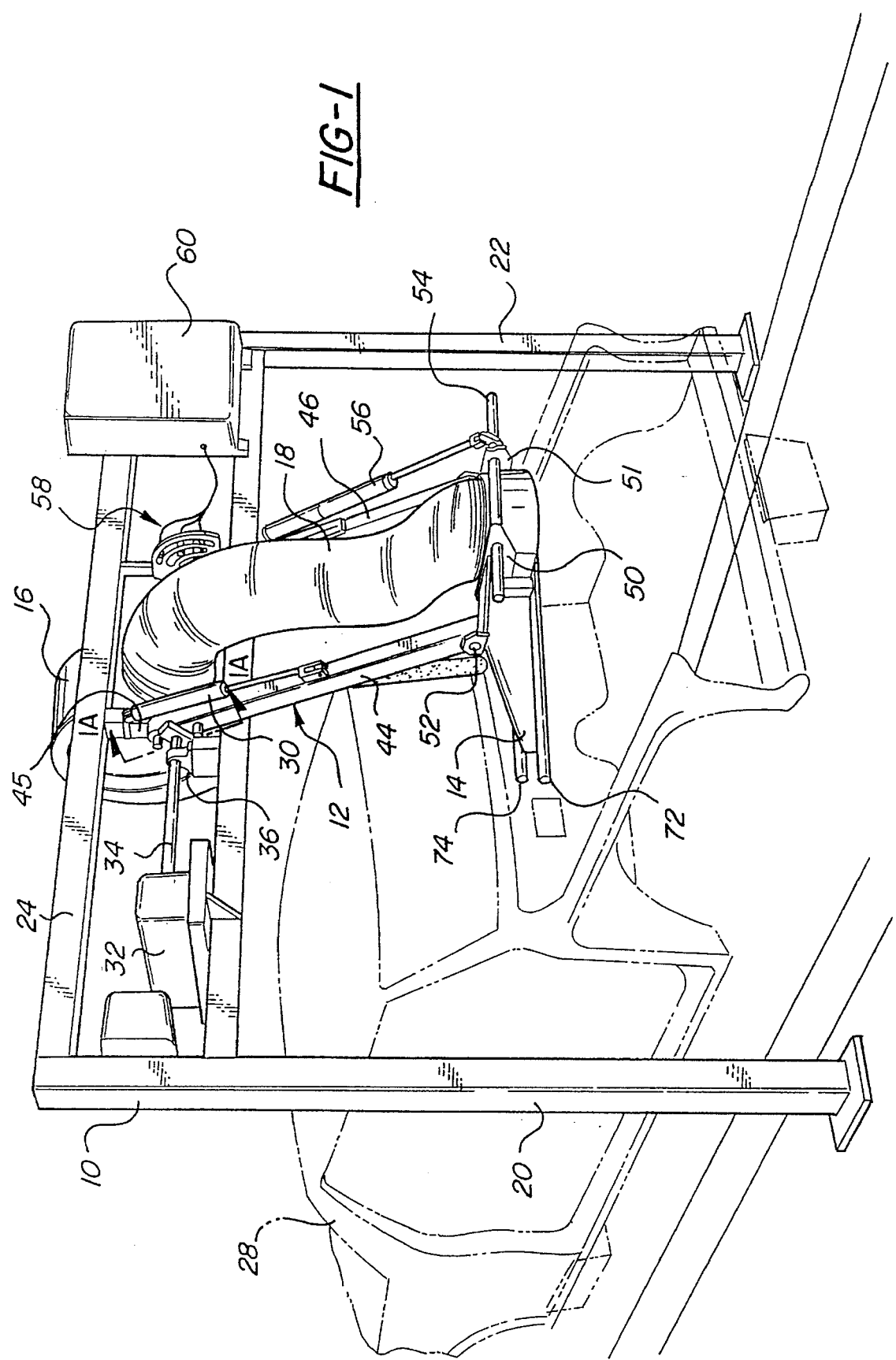
FIG. 1 is a perspective view of an ionized air discharge system for use in the removal of dust and the like from the surfaces of automotive body components prior to painting.
Figure 1A:
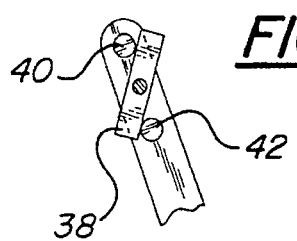

Referring first to FIG. 1, there is shown an apparatus whose primary purpose is to direct a stream of air containing free ions at the various surfaces of an automobile body component 28 for the purpose of removing dust from the body prior to a painting operation. The apparatus comprises a rigid arch 10 carrying a pivotally mounted pivot arm assembly 12 which in turn carries at the free or movable end thereof a nozzle body 14. Nozzle body 14 is of molded plastic construction, is Venturi-shaped and has an inlet at the upper, larger end to receive air at a high flow rate from a motor driven turbine style blower 16 through a flexible duct 18. Blower 16 is mounted on arch 10. Nozzle body 14 is provided with an elongate slot-like outlet at the lower, narrower end. The nozzle shape accelerates the air from inlet to outlet as will be apparent to those skilled in the art.

Arch 10 comprises a pair of spaced parallel upright structural members 20 and 22 which are preferably constructed of corrosion-protected steel or aluminum box section beams joined by an upper cross arm 24 and a parallel, lower cross arm 26 of similar construction. The arch is preferably of welded construction and, in the illustrative embodiment of the patent drawing, it is of such size and shape as to permit the passage of an automobile body structure 28 therethrough where it is treated prior to painting with and through the use of the present invention. The arch 10 may be permanently mounted such as by bolts to a factory floor or may be made portable for relocation purposes according to the desires of the user.

The pivotal arm assembly 12 comprises parallel spaced apart rigid structural pivot arms 44 and 46 connected for pivotal movement relative to the arch 10 under the control of a counterbalancing cylinder 30 which is connected between the pivot arm 44 and an upright 45 welded in place between the cross arms 24 and 26. Cylinder 30 is pressurized and/or independently powered so as to essentially neutralize the cantilever suspended weight of the pivot arm assembly 12 and nozzle 14 such that it can be raised or lowered with relatively little force in either direction, the balance being slightly biased in favor of movement of the pivot arm assembly 12,14 under its own weight in the downward direction. Arcuate or pivotal movement of the pivot arm assembly 12 is produced by a motor 32 having an output torsion shaft 34 connected through a suitable bushing 36 to a torque bar 38. The axle 34 is welded to the torque bar 38 to drive it in a counter-clockwise direction when viewed in FIG. 1, but is not directly connected to the pivot arm 44. Instead, the torque bar bears against two longitudinally spaced pins 40 and 42 which project outwardly from the lateral side surface of the arm 44 so that the motor 32 can operate through the torque bar only to lift the pivot arm assembly 12 and nozzle 14. The torque bar 38 and pins 40,42 provide a lost motion torsional connection such that the motor 32 cannot drive the pivot arm assembly 12 and nozzle 14 in the downward direction. This is a safety feature and is more fully described in the copending application entitled "Contour Dryer," attorney's Docket No. BEI 0132 PUS, filed Oct. 31, 1994 and assigned to Belanger, Inc. of Northville, Mich.

Figure 2:
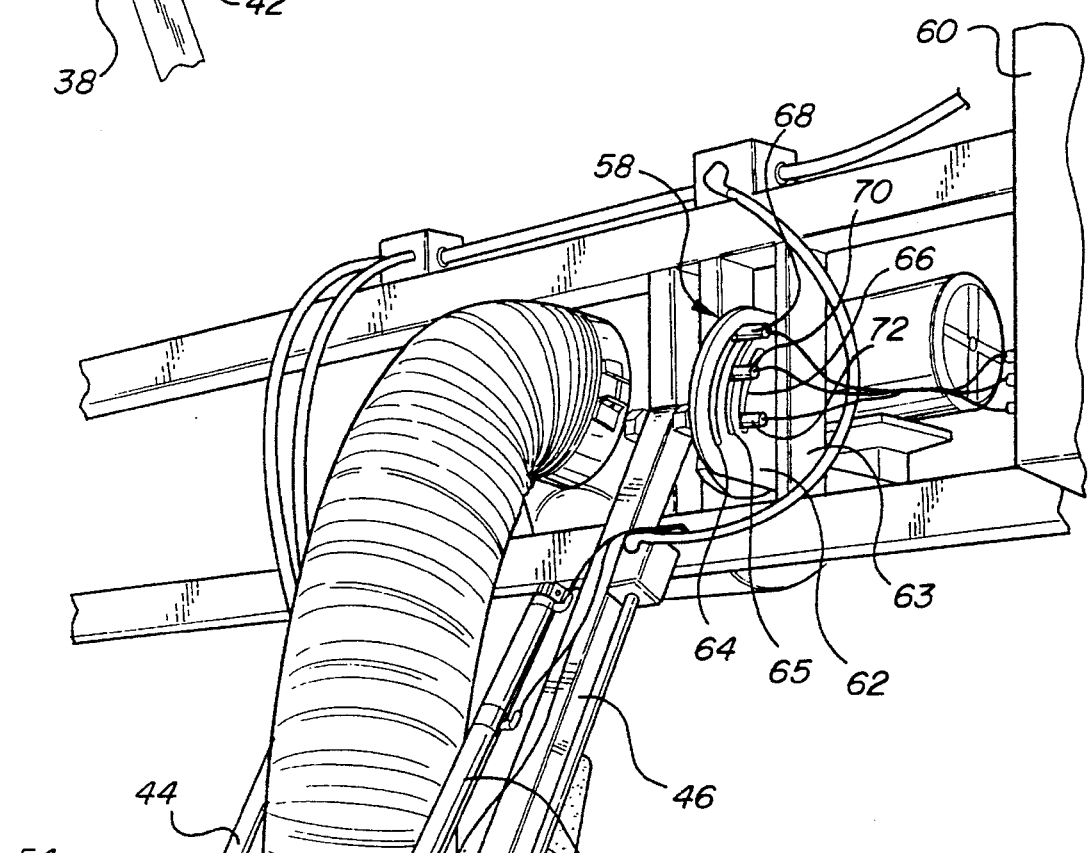
FIG. 2 is a perspective view of the nozzle and nozzle carriage together with an electro-optical nozzle orientation programmer.

Secured to a reinforced structural area of the nozzle 14 are parallel pivot bracket 50 and 51 which define a second pivot axis 52 about which the nozzle 14 can rotate in space relative to the pivot arm structure 12. Passing through and between the brackets 50,51 is a tie bar 54 which is connected to the extensible portion of a three position actuator in the term of a pneumatic cylinder 56, the stationary end of which is pivotally connected to the lower cross arm 26 as best shown in FIG. 2. The mechanical arrangement shown in FIG. 2 is such that as the cylinder 56 is extended, the angular orientation between the air discharge direction of the nozzle 14 and the longitudinal axis of the pivot arm assembly 12 is increased. Conversely, as the cylinder 56 is retracted, the angular relationship between the nozzle discharge and the pivot arm assembly decreases. The duct 18 is flexible not only insofar as configurational changes are concerned, but also longitudinally or lengthwise in the manner of a bellows to accommodate the movement and/or reorientation of the nozzle 14 relative to the pivot arms 44,46.

Figure 4:
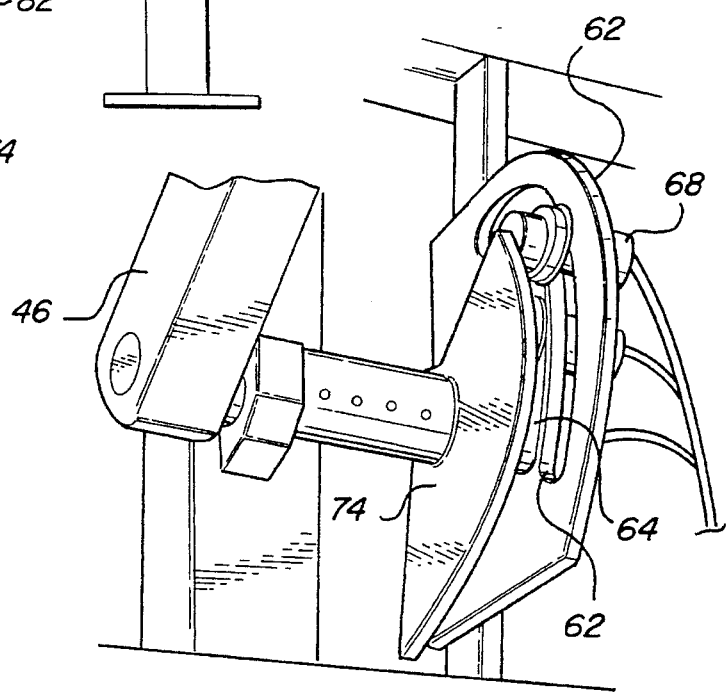
FIG. 4 is a closeup showing details of the electro-optical programmer.
Figure 5:
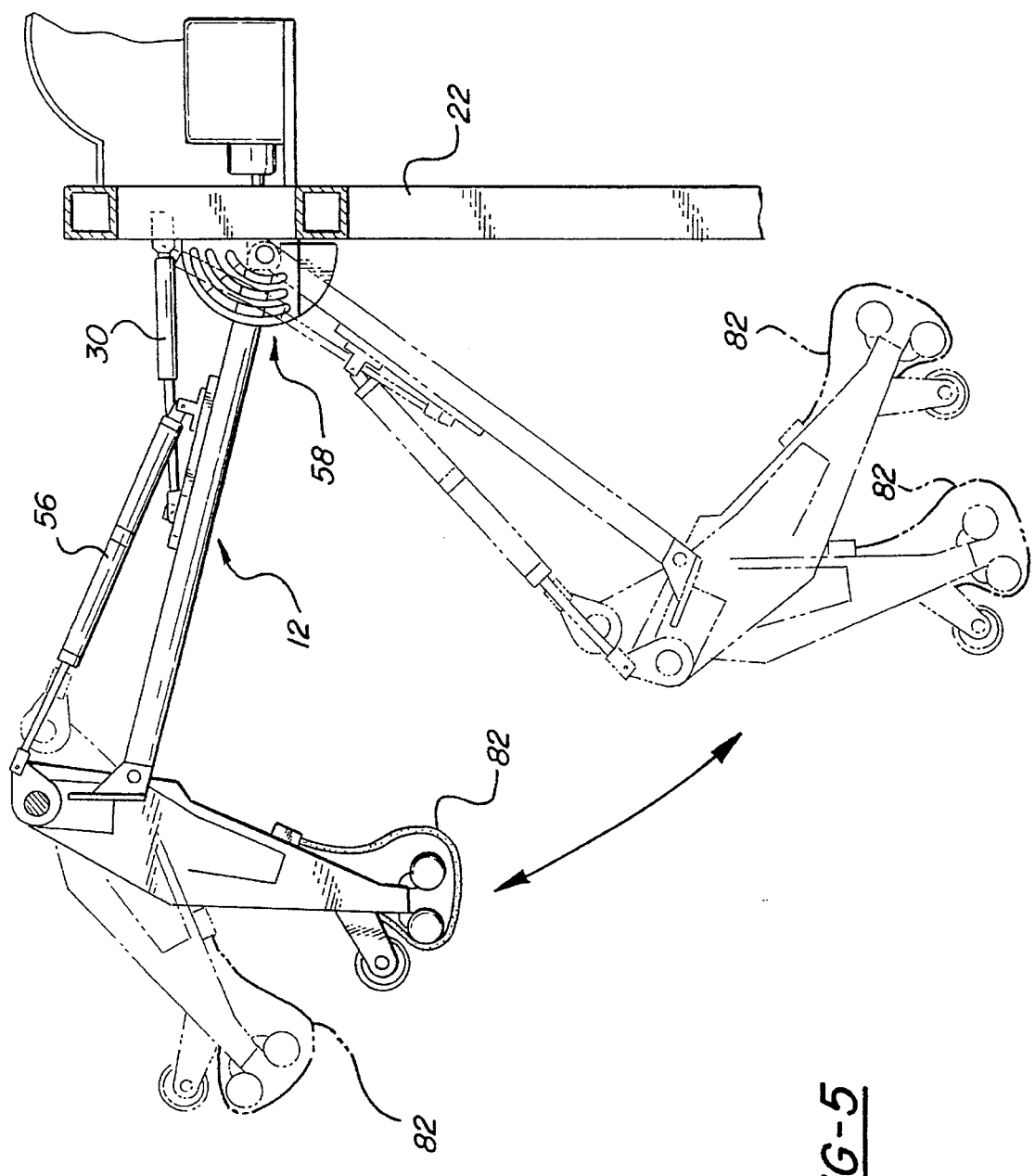
FIG. 5 is a side view of the nozzle and pivot arm structure illustrating various programmably achieved nozzle orientations.

The actuator cylinder 56 is under the control of a programmer 58,60 of which portion 58 is a position transducer and portion 60 is an electronic center suitable housed within an enclosure for environmental protection. The position transducer as best shown in FIGS. 2 and 4 comprises a rigid aluminum plate 62 mounted in a fixed position on an upright structural component 63 between the upper and lower cross arms 24 and 26. The plate 62 is provided with three parallel arcuate slots 64, 65 and 66. Each slot represents by its intercepted angle the full range of angular motion of the pivot arm assembly 12 relative to the arch 10; i.e., even though the slots are of progressively smaller absolute length, each represents the same subtended angle of pivot arm assembly movement.

Independently positionable in the three slots 64, 65 and 66 are electromagnetic proximity detectors 68, 70 and 72, respectively. The transducers cooperate with a sector-shaped ferrous metal shutter 74 which is mounted for pivotal rotation with the pivot arm 46 to intercept the detectors 68, 70 and 72 according to their respective positions. When the shutter 74 intercepts a given detector, the presence of a ferrous metal mass in front of the detector causes a signal to be produced indicating that the pivot arm assembly 12 is in a particular position. It is the function of the programmer 58,60 to correlate an angle of the nozzle 14 relative to the pivot arm assembly 12 to this pivot arm assembly position. Because each of the detectors 68,70,72 is positionable over the entire range of pivot arm assembly travel, the nozzle orientation program is not linearly linked to the pivot arm angle as would be the case for a rigidly mounted system having no secondary degree of freedom pivot 52 for the nozzle 14. Similarly, the nozzle 14 is not oriented at a fixed angle in space as would be the case for a parallelogram-type interconnection between the nozzle 14 and the arch 10. Rather, the nozzle 14 can be placed in any orientation within the limits of the physical apparatus at each of three preselected pivot arm angles corresponding to the positions of detectors 68, 70 and 72. Suitable electromagnetic detectors are available from Turek. Optical, sonic and other types of proximity detectors and switches can, of course, be used. Moreover, pivot arm angle can be measured in other ways; i.e., by monitoring the angular position of motor shaft 34.

In the arrangement illustrated in the patent drawing, it is desirable to have a maximum angle between the nozzle discharge axis and the pivot arm assembly 12 at the lowermost pivot arm assembly position, thereby to direct the air stream at the front or vertical surfaces of an automobile body assembly and to substantially reduce the angle between the air discharge and the pivot arm axis at higher positions represented, for example, by the hood and roof elevations of the automobile body component 28. The important point is that the orientations of the nozzle 14 may be selected according to the configuration of the workpiece simply by moving the detectors 68,70,72 along their respective mounting slots. In the structure shown in FIG. 4 this is readily achieved by means of a simple arrangement of washers and nuts on the detector bodies which grip the opposite outside surfaces of the plate 62 to secure the detectors and which can be readily loosened to permit movement. The detectors are electrically connected to control box 60 which contains suitable hard wired and/or software-directed electropneumatic components to operate the actuator cylinder 56 at discrete pivot arm assembly positions as described with reference to FIG. 6.

FIG. 6 illustrates in schematic detail the control system which binds the proximity/position detectors 68,70,72 to the actuator cylinder 56. This system comprises signal conditioning circuitry 90 to convert the AC detector outputs to DC and to change from high to low voltage for application to microprocessor 92. The microprocessor 92 is programmed to decode different input signal combinations into different output voltages on a simple digital code basis; e.g., if the output of detector 68 is high while the outputs of detectors 70,72 are low the microprocessor correlates "100" with a desired blower attitude in a look-up table and outputs the appropriate driver signal level through amplifier 94 to control valve 96. The valve controls the flow of fluid to cylinder 56 to achieve the desired nozzle attitude. A position feedback signal may be generated by a limit switch or the like at the nozzle or cylinder and feed back to the microprocessor 92 for feedback-type positioning precision if desired. An output of "010" from detectors 68,70,72 produces a different driver output to produce a different nozzle attitude via amplifier 94 and valve 96. As will be apparent to persons skilled in control systems technology, the system of FIG. 6 may take various forms.

Mounted on the exterior of the molded plastic nozzle body 14 are spaced apart parallel ion bars 72 and 74, the function of which is to introduce a high volume of positively and negatively charge ions into the air stream emerging from the slot-like outlet of the nozzle 14. These positively and negatively charged free ions are available to combine with static charged particles on the surface of the body component 28, thereby neutralizing the charge on or associated with such particles and permitting them to be easily and quickly removed from the surface of the body 28 by the air stream. It has been found that such a process produces an extremely clean surface and, as a result, a high quality paint finish.

To this end, ion bar 72 is connected to a positive DC voltage and ion bar 74 is connected to a negative DC voltage. The spacing between the electrodes of the ion bars 72,74 is on the order of 1–2 inches in the industrial application shown in the patent drawing. The length of the bar 72,74 is such to exceed the length of the slot-like outlet of nozzle 14 by a few inches and the electrodes in the ion bar 72,74 are evenly distributed along the length of the nozzle outlet so as to produce an even distribution of positively and negatively charged ions into the air stream. Suitable ion bars are available from Simco.

Figure 3:
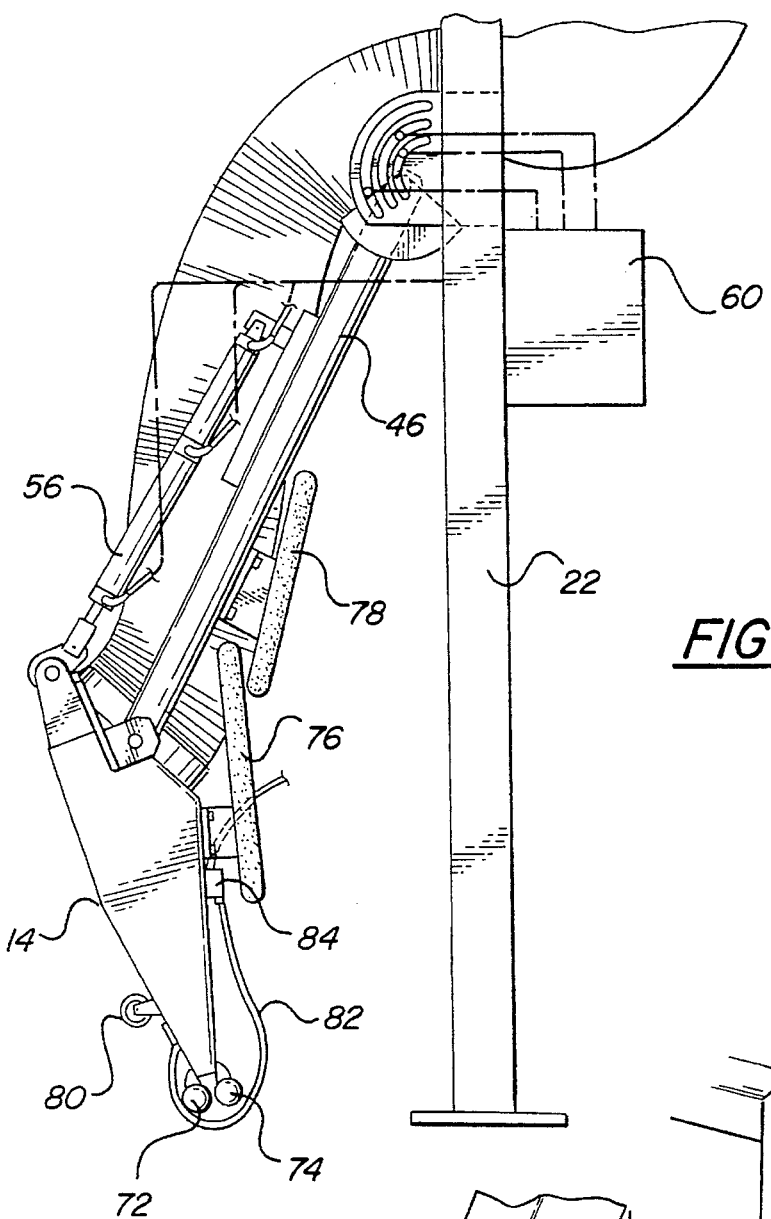
FIG. 3 is a side view of the nozzle and programmer of FIG. 1.

Preferably but optionally, the structure carried by the pivot arm assembly 12 is provided with soft plastic bumpers 76 and 78 and/or wheels 80 to prevent damage to the nozzle and/or to the workpieces being treated by the structure of the invention in the event of inadvertent contact. Preferably but optionally, the nozzle is further provided with a flexible plastic wand-type feeler 82 which is anchored on the outside forward surface of the nozzle body 14 as shown in FIGS. 2 and 3 and which wraps around the outside of the ion bars 72,74 in compliant spaced relationship to the undersurface of the nozzle body where it is connected to a limit switch 84 which is normally open. Switch 84, however, is switched to a closed circuit configuration in the event of contact between the wand-like feeler 82 and, for example, the automobile body component 28 signalling imminent contact between the automobile body and the nozzle. This electrical signal is communicated to the controller 60 by suitable wiring to cause the nozzle body 14 to be reoriented to the least included angle and the pivot arm assembly 12 to be raised independently of the signals which come from the detectors 68, 70 and 72. In other words, the feeler 82 and limit switch 84 provide an emergency repositioning system which overrides the normal function of the programmable controller 58,60. Further disclosure of such apparatuses may be found in the aforementioned copending application BEI 0132 PUS, the contents of which are incorporated herein by reference.

It will be understood that the specific apparatus disclosed and described in detail herein is illustrative in nature and that various modifications, additions and deletions thereto may be made without departing from the spirit and scope of the invention.

We claim:

1. Apparatus for producing a high flow-rate air stream comprising:

support means;

a pivot arm assembly mounted on the support means for controlled pivotal movement throughout a predetermined angular range;

an air nozzle having an air outlet and being pivotally mounted on the free end of the pivot arm assembly for movement therewith as well as pivotal movement relative thereto;

actuator means for selectively angularly orienting the nozzle relative to the pivot arm assembly; and programmable means for activating said actuator means for selectively angularly orienting said nozzle in each of at least first and second orientations relative to the pivot arm assembly when said pivot arm assembly is in first and second respective angular positions, each of said first and second angular orientations being selectable in each of the pivot arm assembly positions.

2. Apparatus as defined in claim 1, wherein said programmable means comprises a plurality of position detectors for sensing the position of said pivot arm assembly means permitting each of said detectors to be positionable in any position over the entire range of pivot arm assembly movement, and activator means movable with said pivot arm assembly and proximate said detectors to activate and deactivate said detectors according to the relative positions of said pivot arm assembly and said detectors.

3. Apparatus as defined in claim 1 further including means for supplying said air nozzle with a large flow volume of air.

4. Apparatus as defined in claim 1 wherein said support means comprises an arch having spaced apart vertical members and a transverse member bridging said vertical support members and connected therebetween at the upper ends thereof, said arch being of such size as to permit automotive body components to be passed therethrough.

5. Apparatus as defined in claim 1 further including:

means for sensing imminent contact between said nozzle and a workpiece and generating a signal indicative of such imminent contact;

means for transmitting said signal to said actuator means for causing said nozzle to assume a predetermined orientation independent of said programmable means.

6. Apparatus as defined in claim 1 wherein:

said nozzle has an elongate air outlet; said apparatus further including at least one charged ion-generating bar mounted externally adjacent said outlet to add free ions to said air stream.

7. Apparatus for producing a directable stream of ionized air comprising:

blower means for producing an air stream;

nozzle means for discharging said air stream;

duct means connecting said blower means to said nozzle means;

a displaceable support assembly carrying said nozzle and displaceable over a range of vertical positions;

programmable means for varying the orientation of said nozzle means relative to said support means; and means associated with said nozzle means for ionizing said air stream.

8. Apparatus as defined in claim 7 wherein said programmable means comprises:

a) means pivotally connecting the nozzle means to the support assembly;

b) actuator means for varying the pivot angle between said nozzle and said support assembly;

c) means for determining the position of the support assembly; and d) programmable means for activating said actuator means to place said nozzle in a first angular orientation when said support assembly is determined by said determining means to be in a first position and activating said actuator means to place said nozzle in a second orientation when said support assembly is determined to be in a second position, each of said first and second positions being selectable over substantially the entire range of motion of said support assembly.

9. Apparatus as defined in claim 7 further including a fixed support, said displaceable support assembly being pivotally mounted to said fixed support; counter-balancing means for reducing the effective weight of the support assembly relative to said fixed support; and actuator means operable by said programmable means for varying the orientation of said nozzle means relative to said support assembly.

10. Apparatus as defined in claim 7 wherein said nozzle means is of molded plastic construction, is venturi-shaped and provides an elongate slot-like outlet for said air stream.

11. Apparatus as defined in claim 7 further including means for sensing imminent contact between said nozzle means and a workpiece and for re-orienting the nozzle in response to avoid such imminent contact.

12. Apparatus for directing a stream of ionized air onto a workpiece comprising:

a molded plastic, venturi-shaped nozzle body defining an internal air chamber having an inlet and an elongate slot-like outlet;

at least one elongate ionizing bar mounted on said nozzle body adjacent said outlet and in parallel, spaced relation to said outlet;

means for supplying a volume of air under pressure to said inlet; and means for varying the orientation of said nozzle relative to said workpiece so that said air stream is directable over a surface of said workpiece as said air stream is applied to said workpiece.

13. Apparatus for directing a stream of ionized air onto a workpiece comprising:

a venturi-shaped nozzle body of substantially rigid material defining an internal air chamber having an inlet and an elongate slot-like outlet;

at least one elongate ionizing bar mounted on said nozzle body adjacent said outlet and in parallel spaced relation to said outlet;

means for supplying a volume of air under pressure to said inlet; and, means for varying the orientation of said nozzle body relative to said workpiece so that said air stream is directable over a surface of said workpiece as said air stream is applied to said workpiece.

* * * * *